United States Patent [19]
Lebrecht

[11] Patent Number: 5,184,810
[45] Date of Patent: Feb. 9, 1993

[54] CENTERING AND CLAMPING DEVICE

[76] Inventor: Horst Lebrecht, Blönrieder Strasse 3/1, 7963 Altshausen, Fed. Rep. of Germany

[21] Appl. No.: 680,110

[22] Filed: Mar. 28, 1991

[30] Foreign Application Priority Data

Apr. 3, 1990 [DE] Fed. Rep. of Germany ....... 4010653

[51] Int. Cl.⁵ .............................................. B23Q 3/02
[52] U.S. Cl. ................................ 269/309; 29/33 P; 29/563; 269/20; 279/75
[58] Field of Search ............... 279/4, 75; 294/82.26, 294/82.28; 198/345.3, 346.1; 29/33 P, 563; 409/233, 234; 269/20, 309, 310; 82/160, 169

[56] References Cited

U.S. PATENT DOCUMENTS

| | | | |
|---|---|---|---|
| 3,430,305 | 3/1969 | Geffner | 294/82.28 X |
| 3,821,844 | 7/1974 | Harman et al. | 483/18 X |
| 4,445,675 | 5/1984 | Kitaura | 269/20 |
| 4,482,043 | 11/1984 | Bauman et al. | 198/346.1 |
| 4,577,847 | 3/1986 | Schedwin | 269/309 |
| 4,636,135 | 1/1987 | Bancon | 294/82.28 X |
| 4,676,142 | 6/1987 | McCormick et al. | 279/4 X |
| 4,678,077 | 7/1987 | Bertorello | 198/345.3 |
| 4,688,974 | 8/1987 | Wright et al. | 269/20 X |
| 4,720,114 | 1/1988 | Braitmaier et al. | 82/169 X |
| 4,793,053 | 12/1988 | Zuccaro et al. | 483/901 X |
| 4,838,533 | 6/1989 | Büchler | 269/310 |

FOREIGN PATENT DOCUMENTS

| | | |
|---|---|---|
| 3518581A1 | 11/1986 | Fed. Rep. of Germany . |
| 3710472C2 | 10/1988 | Fed. Rep. of Germany . |
| 3839681A1 | 6/1989 | Fed. Rep. of Germany . |
| 0224226 | 12/1984 | Japan ............... 409/234 |
| 1364443 | 1/1988 | U.S.S.R. ............ 29/563 |
| 1450975 | 1/1989 | U.S.S.R. ............ 29/563 |

*Primary Examiner*—Z. R. Bilinsky
*Attorney, Agent, or Firm*—Jacobson, Price, Holman & Stern

[57] ABSTRACT

A centering and clamping device for clamping a support (4) to a base (1) has contact surfaces (29 and 8) which come into contact with each other and have installed therein device parts (5 and 2), with passive (6) and active (3) coupling elements. The device parts have centering elements (31 and 33) which work in conjunction, one of which (31) is designed to yield elastically in the direction of clamping. The active coupling element (3) contained in the base part (2) of the device can be moved between its retracted position within the contact surface (8) of the base (1) and an operating position where it projects above this contact surface. The elastic centering element (31) is a circular collar having a base area, reduced in cross-section, and an S-shape (36) by narrow radial circular grooves (34, 35).

21 Claims, 3 Drawing Sheets

CENTERING AND CLAMPING DEVICE

BACKGROUND OF THE INVENTION

The invention relates to a centering and clamping device.

A clamping device of this type is known in the prior art from German Patent No. 37 10 472. Here the support is a tool and the base is the arm of a robot. That part of the device facing the support (support part) is designated as the tool receiver and that part of the device facing the base (base part) is designated as the coupling element. The passive coupling element on the support part is a stay bolt, whose head displays a conical undercut area; the bolt engages with a receiver bore in the base part. Located on the wall of this bore is a collar consisting of balls which are pushed toward the center by a actuator in the form a circular piston employing a spring force; the balls seize the head of the stay bolt and draw it inward until the support part comes into contact with the open face of the base part. Centering occurs independent of the clamping system and by means of four centering pins with tapered heads, which engage with the openings of a flexible centering plate that can be moved in the axial direction.

A disadvantage of this known clamping device is that the stay bolt in the support part and the centering pins on the base part project above the contact surface and that there is a relatively deep insert hole on the base part. These two structural features make it impossible to employ the machine table of a machine tool as a base for the device, since in operation without a clamping device, chips and dirt would enter the insert hole and because of the protruding centering elements it would be impossible to position and displace the tools or clamp them in another place.

BRIEF SUMMARY OF THE INVENTION

The object of the invention is to provide a clamping device suitable for installation on machine tooling tables, measuring tables, or the like, which has a relatively low installation height (in the direction of clamping) and is insensitive to dirt and to foreign objects.

This object is achieved by the invention in a clamping device described below wherein the base is a level plate and that the base part of the clamping device fits into this plate, preferably in a flush manner, and is sealed against dirt when in a state of rest.

The base is configured as a machine table which may be additionally provided with a T-groove and with openings that permit workpieces to be clamped in conventional fashion to permit treatment with mounting claws.

It is also possible, however, to rapidly and very precisely position and clamp a support, along with a workpiece secured to it, by means of the clamping device of this invention. In this case, the support may also have an extended, level contact surface which comes to rest immediately against the surface of the base. This will advantageously permit a clamping action which is free of vibration. The members of the coupling element in the base part are protected against dirt. This makes it easily possible to configure the front area of the coupling element facing the support part in closed fashion and if desired, sealed against dirt. This protection is particularly effective before mounting the support and after removing it.

The invention can be realized in two versions. In one version the passive coupling element projects from the support and protrudes downwardly from the support, so that when mounting the support on the base the passive coupling element at least partly penetrates the active coupling element.

In the second version, the active coupling is moved into an operating position that projects above the contact surface of the base.

Preferably, the passive coupling element fits into the support part, with an open space in the adjacent area to receive the active coupling element. It is advantageous to provide the passive coupling element with a floating mount, i.e., such that it can move diagonally or in pendulum fashion, in order to thereby uniformly introduce the tensile load. The passive coupling element may take the form of a pin enclosed by an annular space, or a socket which is gripped by the active coupling element from the inside. The recessed position protects the passive coupling element from damage caused by frequent transport of the support.

The active coupling element, which can be inserted and removed, preferably consists of two annular coaxial pistons as well as tensioning elements which are mounted on the pistons and grip the passive coupling element due to displacement of one of the annular pistons relative to the other and which exert tension on the passive coupling element. Suited to this end are various tensioning elements, known to the prior art, which can be applied in straddled fashion to the outer circumference of the active coupling element when the passive coupling element is a sleeve that is gripped from the inside. In the alternative version, the tensioning elements rest on the inner circumference and move radially in the inward direction.

A preferred active coupling element is configured so that an outer annular piston displays a collar which overlaps the face of the inner annular piston and whose inner supporting surface facing the inner annular piston supports a number of balls, and the face of the inner annular piston is bevelled in such a way as to push the balls radially inwardly, causing them to engage the head of the passive coupling element, configured as a coupling pin, and to rest against the conical undercut surface of the pin. At the outset, the two annular pistons move in conjunction. Then the inner annular piston continues and initiates the clamping process.

The outer annular piston has a stop which limits its outward stroke relative to the base part while in operating position. The annular pistons have carrier stops, so that the inner annular piston draws the outer annular piston along with it during return to the rest position.

With respect to the activation of the active coupling element, the preferred design employs a spring element to return the coupling element to resting position and employs a mechanical or hydraulic power drive for actuation. Structurally this is achieved by a central column positioned on the base part which penetrates and guides the inner annular piston, and a spring supported by the central column which returns the inner annular piston to resting position. The inner faces of both annular pistons are acted upon by a pressure medium for outward movement and clamping.

The central column has another basic function in that, while the device is in resting position, the opening through the central column formed by the collar of the outer annular piston is sealed by the head portion of the central column and the outer faces form a common plane with the contact area of the base. Seals are also expedient, thus protecting the gap left for movement from dirt penetrating therein.

Preferably, to center the support part in the contact plane a centering cone is provided which yields elastically in the direction of clamping and in such a way that the cone works in conjunction with a corresponding conical area on the base part. Here a particular advantage rests in the fact that the centering cone is a conical collar of circular shape projecting beyond the contact surface of the support and is engaged in a corresponding snap ring groove in the base part, the circular collar and the ring groove serving to enclose the coupling elements. The elastic configuration dispenses with geometric congruity and can be advantageously realized if the base area of the circular collar is S-shaped and is reduced in cross-section by narrow outer and inner radial ring grooves which are positioned opposite each other in the clamping direction.

This results in a thin membrane area which runs more or less parallel to the contact surfaces and which can be subjected to elastic deformation through bending, without permitting radial motion of the circular collar. An advantage of this centering device consists in the fact that as soon as the support is placed in position and the centering areas come into contact, the open annular space of the support is sealed and protected; the result is that the outward motion of the active coupling element and the act of clamping is not impeded by dirt or intrusive objects. Thus the centering device also serves to seal the coupling element.

For the angular positioning of the support on the base relative to the axis of the centering elements it is suggested that at least one projection that has an elastic capability along its width is provided on the support and at least one radially extending rectangular groove is provided on the base. To permit easy cleaning of these members they can be positioned in such a way as to open into the above-mentioned ring groove. An expedient arrangement is four grooves positioned in a cross-shape, thereby allowing positioning in 90 degree stages. To this end, two projections in the form of sliding blocks can be positioned on the support each being separated from an elastic leg by means of a deep, narrow groove, so that the projections can fit into the groove with a certain amount of play.

To assure that the balls that serve as tensioning or gripping elements remain in place, they may be bored through, arranged and strung in series, like a string of pearls, on a spring wire hoop. They will then be held in place when the support part is not mounted but the active coupling element has been actuated. The balls can be conically flattened on two opposite sides along the same axis, specifically in such a way that the lines formed by the cone jacket intersect at the center of the ball collar. This will prevent the balls from wobbling in the course of clamping action, and the spring wire hoop will be relieved of stress.

The clamping device has been described above in terms of a plate-like base and a plate-like support. For plates of larger dimensions, several clamping devices can naturally be used in combination, in order to thereby achieve sufficient tension; here several base parts can be positioned on the base and several support parts can be positioned on the support. When at least two clamping devices are employed, the radial grooves and sliding blocks employed for angular positioning can be omitted. On the other hand, the device can also be used for the clamping and highly precise positioning of individual tools or workpieces, independent of these plate-like structures, such as the clamping of interchangeable tools on the tool-bearing part of a machine, e.g., the erosion electrodes on the sleeve of an electro-erosion machine. Fundamentally, the device is suitable for all cases in which apparatus of this type are employed. A conversion of the form used for plate-structures must naturally be undertaken, such that the device parts, including the contact surfaces, display a positioning orientation in the direction of clamping.

In these and other applications, use can be made of the structural details described even when the active coupling element is not movable. The support and the base or the device parts should have level contact surfaces in common and the centering elements are configured as parts that enclose the coupling elements, each with a conical annular area. It is preferred that one of the two centering elements is an annular collar that protrudes axially relative to the other device. The conical area used for centering will receive the best protection if it is located on the inner side of the annular collar. On the other hand, the sensitive cone-shaped circular area on the other device part will be advantageously shielded from damage if it is configured as the lateral surface of a ring groove open in the axial direction. Whether, and to what extent, the base part and the support part protrude or are recessed (sunk) relative to the corresponding contact surfaces can be determined by the individual case and will depend on whether there are openings to engage the corresponding coupling element and where the centering elements can most favorably be positioned.

BRIEF DESCRIPTION OF THE DRAWINGS

The invention will now be described in detail with reference to the accompanying drawings wherein.

DETAILED DESCRIPTION

Figure 1:
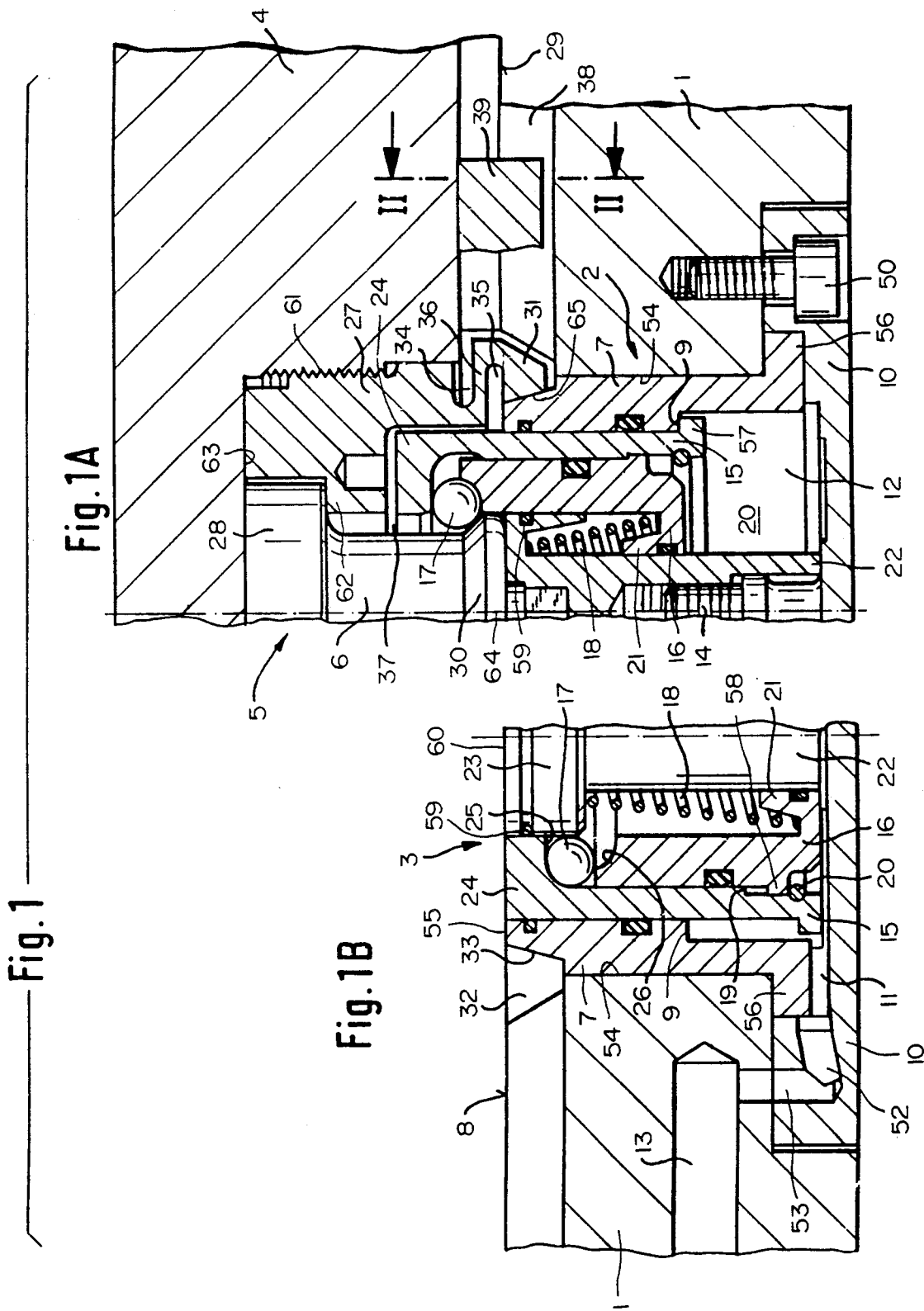
FIG. 1A is a partial axial cross-sectional view of the centering and clamping device of the invention in the unclamped position.
FIG. 1B is a view similar to FIG. 1A showing the device in the clamped position.

FIG. 1 shows a plate-like base 1, installed into which is the base part 2 of the clamping device. The latter includes an active coupling element 3 (FIG. 1A). A support 4, which is also plate-shaped, is clamped, specifically by means of the support part 5 installed in the support 4. This support part contains a coupling bolt or pin which serves as the passive coupling element 6. In FIG. 1A, the active coupling element 3 is shown in the resting, or unclamped, position; in FIG. 1B it is shown in working or clamping position.

In this example, base 1 is a machine tooling table about 40 mm thick and the support 4 is a workpiece pallet, onto which a workpiece, not shown, is clamped, the workpiece being treated on different machines while remaining on the pallet. The pallet can be quickly clamped and positioned onto the tooling table by means of two or more clamping devices, with an accuracy measured in micrometers.

To permit the installation of base part 2, base 1 has a borehole 54 with sections of differing diameter. Introduced into the borehole is a guide ring 7, which engages with a small flange 56 on the shoulder of the large bore and whose upper face 55 is flush with the contact surface 8, i.e., the upper surface of base 1.

The lower section of guide ring 7 has a larger inner diameter than its upper section and thus forms a shoulder 9. A cover plate 10, held on from below by screws or bolts 50 engaging in threaded bores in base 1, holds the guide ring 7 in position. Two bores 52 and 53 running at an angle to each other, and a groove 11 in cover plate 10, connect the pressure space 12 beneath the active coupling element 3 with a borehole 13 in base 1 for hydraulic oil. In its center cover plate 10 has a threaded stem 14 that projects into an opening in base 1.

The active coupling element 3 consists of two annular pistons 15 and 16, a collar with a plurality of balls 17, and a spring 18. The outer annular piston 15 slidingly moves inside guide ring 7 and engages by small flange 57 with shoulder 9 in the area of the latter's enlarged inner section, so that upward motion of annular piston 15 is limited thereby. Outer annular piston 15 also has a lower inner section with a larger inner diameter, which forms a shoulder 19. Inner annular piston 16 has an external collar 58 close to its lower end, which limits the upward relative motion of the inner annular piston 16 through contact with shoulder 19. Motion of piston 16 is limited in the downward direction by a spring ring 20 inserted in an inner groove in outer annular piston 15. On its lower inner side inner annular piston 16 has collar 21 whose cross-section is angular; the collar is penetrated by a central column 22 and slides thereon. Central column 22 terminates at the upper end in a cover or collar 23 having a cylindrical outer contour and with an annular groove therein for a radial sealing ring 59. The upper face 60 of collar 23 lies in the plane of contact surface 8. The central column 22 is screwed onto the threaded stem 14. Conical spring 18 is supported on the lower end by collar 21 of the inner annular piston and on the upper end inside collar 23 of central column 22.

The outer annular piston 15 has a collar, or flange, 24 at the top of which is radially contracted such that it engages tightly against the cylindrical side wall of collar 23. This collar 24 covers the face of inner annular piston 16 and encloses balls 17, for which it provides on its lower side a level supporting surface 25 that runs parallel to the contact surface 8. The face 26 on the upper end of inner annular piston 16 is partly rounded to have a wedgeshaped cross-section on its upper rim. The result is that when this inner annular piston 16 is pushed upwards and displaced relative to the outer annular piston 15, the balls 17 are pressed toward the center.

FIG. 1A shows the details of the support part 5 of the clamping device. A multi-stage borehole in the support 4 has an internal thread 61 in one of its sections and a ring 27 screwed into it. One shoulder 62 of the ring 27 extends over the extended foot, or flange, 28 of the passive coupling element 6, without pressing the foot against the floor 63 of the bore. The coupling element is thereby held within the support part 5, but can move to a slight degree radially, in floating fashion. As an alternative, or in addition, a spherical configuration of the foot and shoulder is possible. The head 64 on the lower end of passive coupling element 6 does not project in the downward direction beyond the contact surface 29 of the support 4. The head has a conical undercut surface 30, on which the balls 17 rest when in the engaged position.

The ring 27 is also responsible for centering, i.e., positioning on the plane formed by the contact surfaces. To this end, the ring has collar 31 which has a trapezoidal cross-section and projects downwards beyond contact surface 29 and fits into a circular groove 32 in base 1 whose cross-section is also trapezoidal. This circular groove 32 is located near guide ring 7 and the inner side thereof is formed by conical surface 33 on guide ring 7. The inner conical surface 65 of the collar 31 serves as the centering area by engaging against the matching conical centering surface 33 of guide ring 7. The circular groove 32 is also deeper and wider than collar 31.

The collar 31 has an elastic or resilient design and will yield or flex in the direction of clamping. Worked into its base area radially are deep and narrow circular grooves 34, 35 on the outside and inside, respectively. A thin membrane area 36 is thereby formed between these circular grooves and runs parallel to the contact surfaces. The membrane area will bend elastically and supports the collar 31. The centering collar 31 thus has a precise axial bending capacity. To this end support 4 is also freely adjustable. The membrane area 36 can absorb high radial forces.

The clamping device thus described functions as follows: In resting position (FIG. 1B) the hydraulic system 11, 12, 13 is pressureless, so that spring 18 returns inner annular piston 16, and, as a result of striking the spring ring 20, outer annular piston 15 as well, to the indicated resting position. The balls 17 occupy their radially outermost position. By means of two small ring seals, outer annular piston 15, with its collar 24, closes and seals the annular gap between guide ring 7 and collar 23 of central column 22. The seals are effective against liquid and dust. Thus, when the device is in resting position, the base part 2 has a perfectly level surface that extends at the same height, or in the same plane as contact surface 8 which is interrupted only by circular groove 32. Before support 4 is mounted, base 1 can easily be cleaned, thereby assuring that disruptive metal chips, or the like, will not be sealed in the circular hollow space 37 of the support part 5 surrounding passive coupling element 6.

When support 4 is mounted, collar 31 engages with the circular groove 32, and the support is centered by means of the centering surfaces 33 and 65 and, simultaneously, hollow space 37 is sealed. The configuration is such that when the weight of the support 4 is not too great, its contact surface 29 will not come into full contact with the contact surface 8 of base 1. However, if pressure space 12 is pressurized, the two annular pistons 15 and 16 will move upwardly together. The outer annular piston 15 will at first have a tendency to move in advance, since it is not immediately under spring pressure. The balls 17 lie in their provided space, which is so dimensioned as to allow them to rest loosely, and will pass the outer sealing ring of collar 23 without friction. Due to the action of spring ring 20, annular piston 15 will draw inner annular piston 16 along with it. The motion occurs on a scale that is sufficient for the hydraulic pressure in space 12 to compress spring 18. Because support 4 has already been positioned, the annular piston configuration can enter hollow space 37 without disruption. When flange 57 of outer annular piston 15 comes into contact with shoulder 9, inner annular piston 16 will continue its motion. With its highly curved face 26, it will pass over the outerside behind balls 17 and press the latter inward radially under the force of the hydraulic medium. Here the balls are supported on one side by the level support area 25 of flange 24 of outer annular piston 15 and on the other side by the conical undercut surface 30 of passive coupling element 6. Thus a force component directed toward the base 1 will be exerted on the passive coupling element and thus on the support part 15 and finally on the entire support 4 so that support 4 will thereby be clamped firmly to the base 1. The centering, exact to micrometers, is also thereby completed. During the final phase of the clamping process the centering collar 31 has a spring action. Also, the foot 28 of the passive coupling element can still be radially displaced relative to ring 27.

Figure 2:
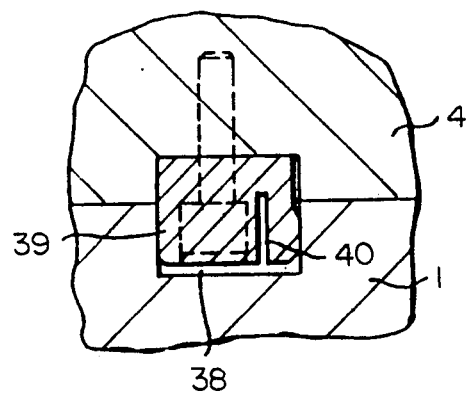
FIG. 2 is a cross-sectional view of a sliding block taken along line II—II in FIG. 1A.

When a clamping device is used alone, its success depends on precise angular positioning with respect to the central axis of the device. For this reason, radial grooves 38 extending from the circular groove 32 are provided in contact surface 8 in a cross-shaped pattern. Engaging with these are, e.g., two sliding blocks 39, connected by screws for example, onto contact surface 29 of support 4. FIG. 2 shows that the radial grooves 38 have a rectangular cross-section and that the sliding blocks 39 are split by a narrow incision 40 to a depth such that the split narrow leg can yield elastically in a direction diagonal to the groove. Thus the sliding blocks 39 engage with radial grooves 38 without play and without impeding the clamping action. Due to the rectangular, cross-shaped disposition of the grooves, four different angular positions for the support 4 are possible.

Figure 3:
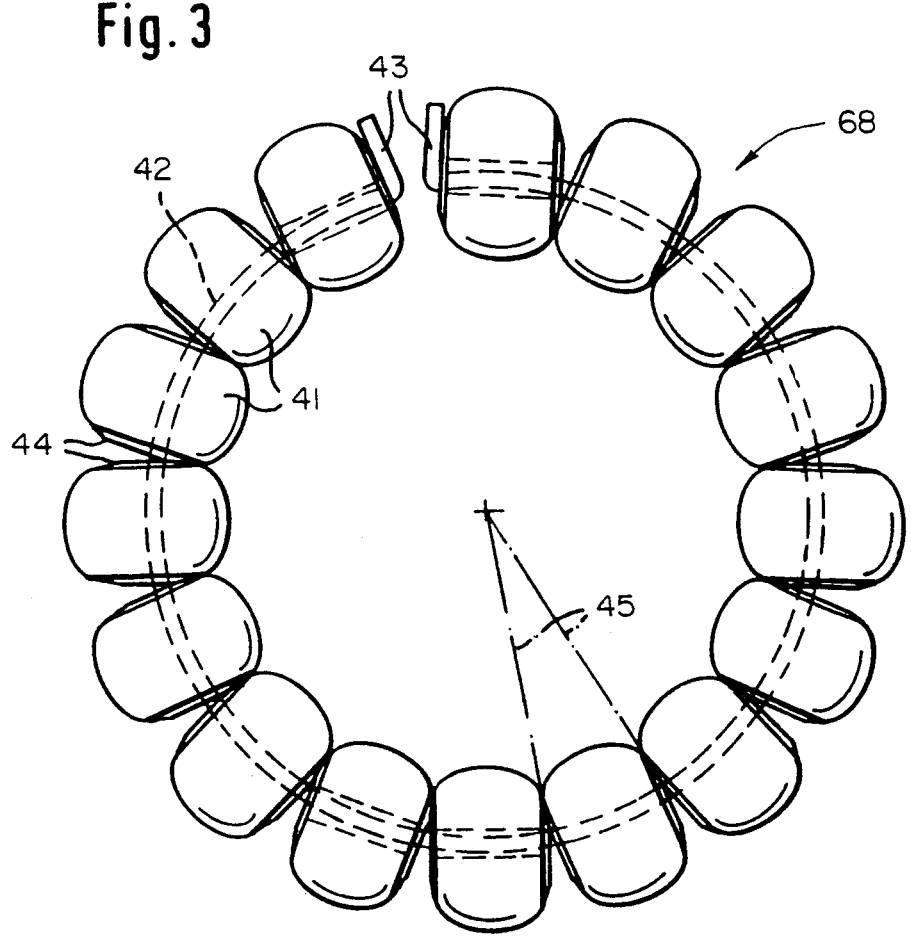
FIG. 3 is an enlarged top plan view of a ball collar for use in clamping.

FIG. 3 shows on an enlarged scale a ball collar 68 that has proved to be particularly effective in use with the described clamping device. It is desirable to keep balls 17 together as in FIG. 1B since they might be pushed out of position and become disassembled when the active coupling element 3 is actuated without a support being mounted and thus without the passive coupling element 6 being in place. The balls 41, as shown in FIG. 3 have therefore been drilled and strung on a circular spring wire hoop 42, whose ends 43 are bent rectangularly in the outward direction to prevent the balls from falling out. Due to pretensioning the spring wire hoop 42 forces the balls radially outward and prevents them from touching the jacket area, or outer surface, of collar 23 of central column 22 when the active coupling element is engaged and disengaged.

FIG. 3 also shows that balls 41 are flattened on two opposite sides, the rim areas of these flattened sides being conical surfaces 44 along which the balls meet to form a line. The conical surfaces 44 have a flat incline such that the contact lines 45 when extended intersect more or less at the center of ball collar 68. The depicted embodiment of the balls 41 prevents them from wobbling as a result of the different forces at play; as a result, tilting or bending of the spring wire hoop 42 is prevented.

In an alternative embodiment, the described clamping device can omit the extension capability of the active coupling element 3, so that the outer annular piston 15 in extended position (FIG. 1A) forms a single piece with guide ring 7. The other structural details can remain unchanged. The upper part of the combined ring configuration would, to be sure, remain projecting above contact surface 8. This would not have to be a disadvantage, however, if the base is a different machine part and not a supporting table. In these cases, considerations of expediency can determine the height of the opposite contact surfaces of the base and the support, e.g., below or above the elastic annular collar 31. In place of extended contact surfaces, circular areas or individual support surfaces might suffice, on or between which the reference markings for the angle setting can be placed.

Figure 4:
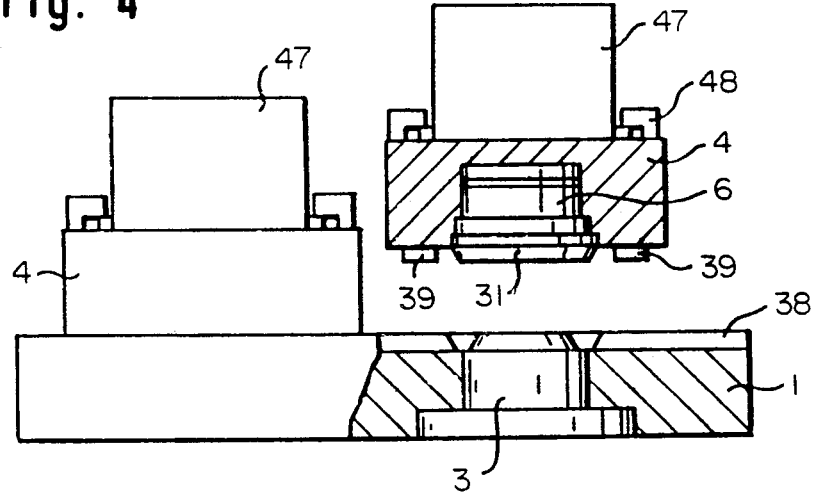
FIG. 4 is a schematic cross-sectional view of a different embodiment of the clamping device according to the invention.
Figure 5:
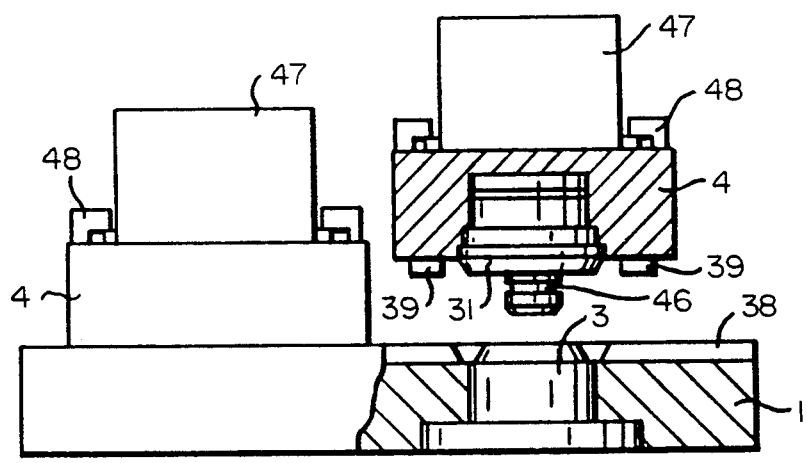
FIG. 5 is a view similar to FIG. 4 of another embodiment of the invention.

FIGS. 4 and 5 show two schematic depictions of the clamping device. In FIG. 4 the base 1 of active coupling element 3 is configured as in FIGS. 1A and 1B. The passive coupling element 6 in the support 4 is also in accordance with that shown in FIGS. 1A and B. The workpiece 47 is held on the support 4 by means of attachment elements 48; after clamping, the workpiece assumes the 14 exact position desired.

In the embodiment according to FIG. 5, a passive coupling element is employed projecting downwardly from support 4, so that when support 4 is mounted on base 1 it projects into the active coupling element 3. In this embodiment it is not necessary for the active coupling element to press against the support 4 during the clamping process.

I claim:

1. Centering clamping device for clamping a support member on a base member comprising:
   a first contact surface on said base member;
   a second contact surface on said support member engageable with said first content surface in a clamping position;
   a passing coupling unit in said support member;
   an active coupling unit in said base member having an actuating part movably mounted for actuating movement projecting through said first contact surface and cooperating with said passive coupling unit for clamping said support member to said base member in said clamping position;
   retracting means engaging said actuating part of said active coupling unit for retracting and retaining said actuating part of said active coupling unit within said base member;
   actuating means for actuating said actuating part of said active coupling unit into said clamping position for grasping said passive coupling unit during clamping;
   a first centering means at least partly on said active coupling unit; and
   a resilient second centering means on said passive coupling unit for cooperating engagement with said first centering means during clamping, said second centering means yielding elastically at least in the clamping direction.

2. Clamping device as claimed in claim 1 wherein said passive coupling unit comprises:
   a support element within a bore in said support member;
   a bore in said support element;
   a coupling member in said support element bore; and
   a space between said coupling member and said support element bore for receiving said actuating part of said active coupling unit in said clamping position.

3. Clamping device as claimed in claim 2 wherein:
   said coupling member is mounted in said support element bore for limited transverse movement relative to said support element.

4. Clamping device as claimed in claim 2 wherein:
said active coupling unit comprises a base part in said base member; and
said actuating part comprises
a first annular outer piston slidably mounted in said base part for movement in an axial direction substantially perpendicular to said contact surfaces,
a second annular inner piston slidably mounted within said first annular outer piston for movement in said axial direction, and
grasping elements movably supported between said pistons for movement between grasping and release positions for grasping said passive coupling unit in said clamping position when said active coupling unit is actuated by said actuating means to displace said pistons relatively to each other and outwardly of said base member and for releasing said passive coupling unit when said actuating part of said active coupling means is retracted by said retracting means.

5. Clamping device as claimed in claim 4, wherein:
said passive coupling unit comprises a coupling pin having an enlarged head on one end thereof and a radially outwardly extending frustoconical surface on said head engageable with said grasping elements in said clamping position;
said inner piston comprises an outer end face and a bevelled radially inner portion on said outer end face;
said grasping elements comprise a plurality of ball members movably engageable with and supported on said outer end face and bevelled portion on said inner piston; and
said outer piston comprises an outer end portion, a radially inwardly extending collar on said outer end portion overlapping said outer end face of said inner piston, and an inner surface on said outer end portion engaging said ball members for retaining said ball members between said overlapping outer end portion of said outer piston and said outer end face of said inner piston.

6. Clamping device as claimed in claim 4 and further comprising:
first step means on said outer piston;
second stop means on said inner piston engageable with said first stop means after initial relative axial displacement of said pistons toward said clamping position so that said pistons move together after engagement of said first and second stop means;
third stop means on said base part; and
fourth stop means on said outer piston engageable with said third stop means for limiting outward axial movement of said pistons when said pistons have been axially displaced farther than said initial displacement into said clamping position.

7. Clamping device as claimed in claim 4, wherein:
said actuating means comprises means for applying a pressurized medium between said base member and said pistons for moving said pistons from a retracted position axially outwardly toward said clamping position;
a central column is provided on said face member extending concentrically with said pistons, said inner piston being slidably engageable with said column member; and
said retracting means comprises spring means between said central column and said inner piston for resiliently urging said inner piston toward said retracted position.

8. Clamping device as claimed in claim 7 and further comprising:
an axially outer face on said outer piston;
an outer end on said central column;
a radially enlarged head member on said outer end of said central column;
an axially outer face on said head;
a radially outer surface on said head member; and
a radially inner surface on said outer piston sealingly engageable with said radially outer surface on said head member so that when said pistons are in said retracted position said axially outer faces and said first contact surface lie substantially is a common place.

9. Clamping device as claimed in claim 1, wherein:
said first centering means comprises a frustoconical surface on said base part; and
said resilient second centering means comprises a centering member on said passive coupling unit having a frustoconical surface thereon engageable with said frustoconical surface on said base member in said clamping position.

10. Clamping device as claimed in claim 9 wherein:
said centering member comprises a circular collar having a frustoconical inner surface thereon engageable with said frustoconical surface on said base part, so that said circular collar is disposed around said coupling units in said clamping position.

11. Clamping device as claimed in claim 10 wherein:
said circular collar protrudes form said passive coupling unit toward said base member and comprises radially inner and outer surfaces;
a first groove extending substantially radially outwardly from said inner surface, and a second groove extending substantially radially inwardly from said outer surface in axially spaced and radially overlapping relationship with respect to said first groove so that said circular collar is reduced in cross-section and is resilient.

12. Clamping device as claimed in claim 1 wherein:
said active coupling unit further comprises a plurality of radially movable ball members releasably engageable with said passive coupling unit in said clamping position; a hole through each ball member; and a circular spring wire hoop extending through said holes for retaining said ball members in the form of a resilient ball collar, 13. Clamping device as claimed in claim 12 and further comprising:
frustoconical faces on opposite sides of each ball member, said faces being engageable with said faces on adjacent ball members along contact lines which when extended intersect at substantially the center of said collar.

14. Clamping device as claimed in claim 1 and further comprising:
a least one radially extending groove having a rectangular cross-section in said first contact surface on said base member; and
at least one projecting member mounted on said output member and projecting form said second contact surface for releasable and resilient engagement in said at least one groove for positioning said coupling units at a predetermined angular relationship with respect to each other in said clamping position.

15. Clamping device as claimed in claim 14 and further comprising:
   a deep narrow slot in said at least one projecting member for providing shoulder means resiliently movable in a direction transverse to said at least one groove.

16. Centering clamping device for clamping a support member on a base member comprising:
   a first contact surface on said base member;
   a second contact surface on said support member engageable with said first contact surface in a clamping position;
   a passive coupling unit in said support member;
   an active coupling unit in said base member having an actuating part extendable through said first contact surface and cooperating with said passive coupling unit for clamping said support member to said base member in said clamping position;
   retracting means engaging said actuating part of aid active coupling unit for retracting and retaining said actuating part of said active coupling unit within said base member;
   actuating means for actuating said actuating part of said active coupling unit into said clamping position for grasping said passive coupling unit during clamping;
   first centering means at least partly on said active coupling unit; and
   resilient second centering means on said passive coupling unit for cooperating engagement with said first centering means during clamping, said second centering means yielding elastically at least in the clamping direction;
   said passive coupling unit comprising:
      a support element within a bore in said support member;
      a bored in said support element;
      a coupling member in said support element bore; and
      a space between said coupling member and said support element bore for receiving said actuating part of said active coupling unit in said clamping position.

17. A centering clamping device for clamping a support member to a base member comprising:
   first and second contact surfaces on said support and base members, respectively, for contacting relationship in said clamping position;
   a passive coupling element mounted on one of said support and base members;
   an active coupling unit mounted on the other of said support and base members and extendable through the corresponding contact surface and releasably engageable with said passive coupling element for exerting a tension force between said support and base members in a clamping position;
   a first centering element on one of said support and base member; and
   a resilient second centering element on the other of said support and base members engageable with said first centering element in said clamping position, said second centering element yielding elastically in the direction of clamping;
   said centering elements surrounding at least part of said passive coupling element and active coupling unit in said clamping position and having cooperating frustoconical engaging surfaces thereon.

18. Clamping device as claimed in claim 17, wherein: said passive coupling element is mounted in said support element for limited transverse movement relative to said support element in the clamping direction.

19. Clamping device as claimed in claim 17, wherein: one of said centering elements comprises a circular collar; radially inner and outer surfaces on said circular collar; a first groove extending substantially radially outwardly from said inner surface; and a second groove extending radially inwardly from said outer surface in axially spaced and radially overlapping relationship with respect to said first groove so that said circular collar is reduced in cross-section and is resilient.

20. Clamping device as claimed in claim 17 and further comprising:
   at least one radially extending groove having a rectangular cross-section in said first contact surface on one of said support and base members; and
   at least one projecting member mounted on the other of said support and base members and projecting from said second contact surface for releasable and resilient engagement in said at least one groove for positioning said passive coupling element and active coupling unit in a predetermined angular relationship in said clamping position.

21. Clamping device as claimed in claim 20 and further comprising:
   a deep narrow slot in said at least one projecting member for providing shoulder means resiliently movable in a direction transverse to said at least one groove.

* * * * *